United States Patent Office 2,710,624
Patented June 14, 1955

2,710,624

PRESSURE OPERATED ACTUATING MECHANISM

Harold A. Quist, Swarthmore, Pa., assignor to Sun Oil Company, Philadelphia, Pa., a corporation of New Jersey Application May 9, 1952, Serial No. 286,863

12 Claims. (Cl. 137—247)

This invention relates to pressure operated devices and more particularly to pressure responsive elements interposed between a source of pressure and the device to be actuated.

In the storage of volatile liquids common in the chemical and petroleum industries, pressure operated mechanisms are well known. The preservation of storage equipment and simultaneous conservation of the stored volatile products has required development of relief devices equally responsive to both pressure and vacuum conditions. Although the greatest development of such devices has been demonstrated in the two forms of directly operated and pressure-selected operated relief valves, other devices such as signals, flow valves, mixing valves, temperature controls, safety and fire prevention equipment and the like can also be pressure operated. It is an object of this invention to provide a pressure operated actuator for general use which is responsive to both pressure and vacuum conditions alike.

The primary requirement of pressure operated equipment is to make the response accurate within a preselected pressure range and further to make the operation decisive. Partial or incomplete response in starting or stopping an operation for either excessive pressure or vacuum in addition to being hazardous is expensive because of undue wear and false conservation. It is, therefore, a further object of this invention to provide a pressure responsive actuator which is accurate in response and free of "hunting" and "chattering."

Devices subjected to direct contact with pressure sources normally transmit all the objectionable fluctuations of the pressure medium. The resulting operation is unsatisfactory. Cables, levers, and other motion correcting and absorbing devices have been introduced. Although the resulting pressure induced movement has been smooth and accurate, much of the pressure force has been consumed in overcoming friction and inertia. It is a further object of this invention to provide pressure operation at the desired location of substantially the full force and effect of the pressure or vacuum of the source.

Together with the fluctuations inherent in direct pressure affected mechanisms, there is always present, to some degree, either a pressure or vacuum condition. As used throughout this specification, these terms of "pressure" or "vacuum" are always based on normal atmospheric pressure as a reference and usually indicate an excess of either of the conditions over an established norm. It is the unusual rather than the usual pressure condition in operating equipment that is exactly equal to atmospheric pressure. Consequently, except for these unusual conditions, there exists positive or negative pressures usually not amounting to the excess requiring the pressure responsive elements to operate. Such pressures affect directly connected devices causing unbalance of the operated mechanisms and resulting unsatisfactory incomplete operation. It is still another object of this invention to provide an actuator which maintains all operable mechanisms in balance except when actually causing them to respond to predetermined excesses of pressure or vacuum.

In accordance with the present invention, a pressure selective means is physically connected to a pressure responsive means which causes the desired operation. A pair of inverted cups are pivotally suspended in a liquid seal over separate conduits connecting directly with a pressure source to form the pressure selective means. The pivotally supported connection between the cups is articulated to permit limited separate movement of the cups. Pin stops are arranged to cause both cups to move in the same direction about the pivot point for the transmission of specific pressure conditions.

One of the cups is adapted to engage a conduit and transmit the operating pressure directly to a diaphragm mounted in contact with the elements to be operated. The diaphragm together with the linkage necessary to connect the flexible or semi-rigid walls to the device to be operated comprises the pressure responsive means. Depending upon the excess pressure transmitted being pressure or vacuum, the resulting diaphragm movement reciprocates additional operating or control means. The responsive electrical, hydraulic or gaseous operation is immediate and accurate.

For a more complete understanding of the nature and scope of the invention in which the above noted objects and others will be evident, reference is made to the following detailed description read in connection with the accompanying drawing in which.

Figure 1:
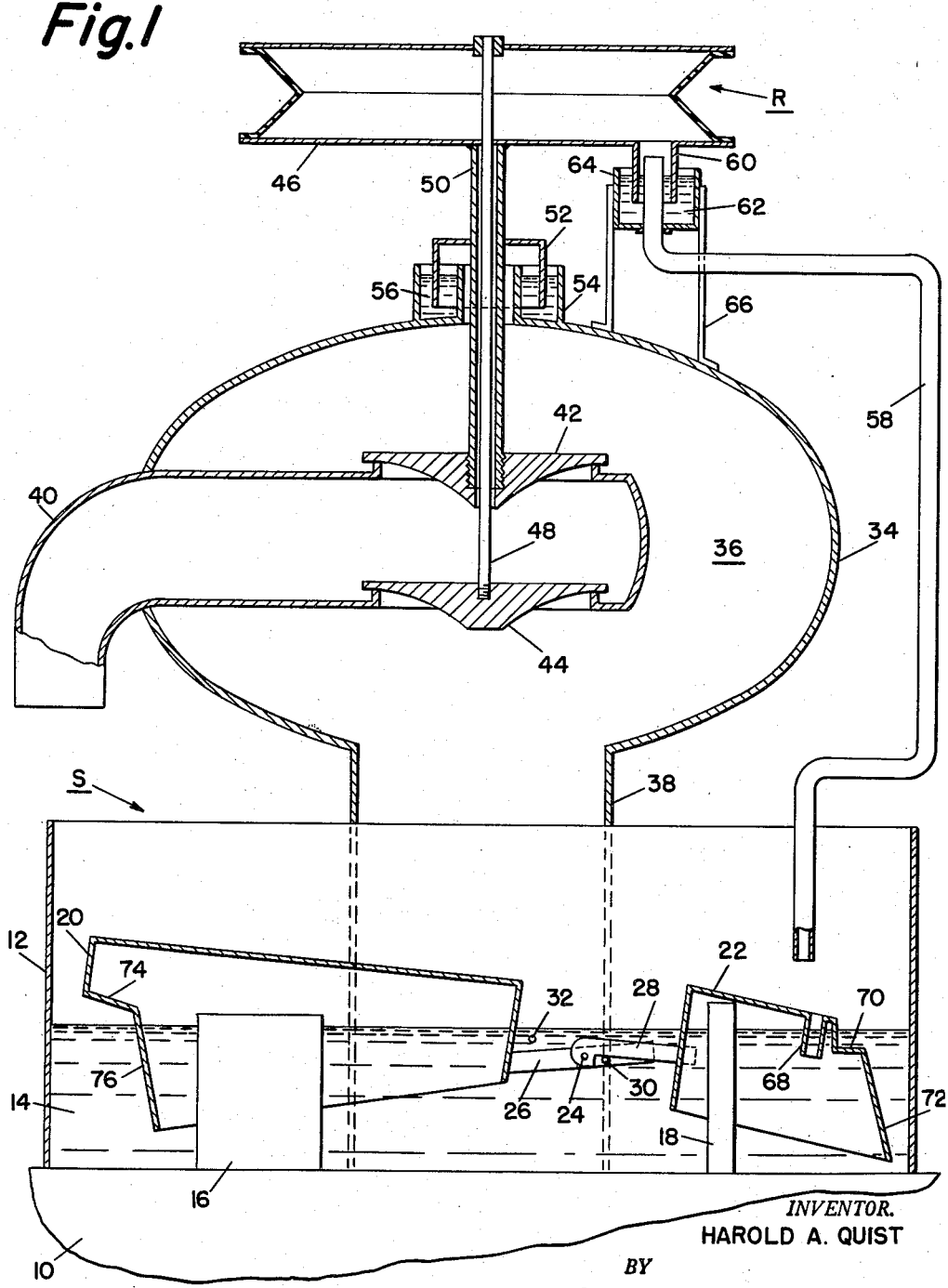
Figure 1 is an elevational view in section showing the device in the neutral position.

The elements of the pressure responsive actuator shown in the figures of the drawing are connected, for illustrative purposes only, to the operating members of a relief valve. Separate valve members are shown individually responsive to either an excess pressure or excess vacuum condition. One use for the disclosed mechanism is thus illustrated. Substitution of any desirable actuated devices may be readily made for the valve members such as electrical contacts, fluid valves, rods and levers, and the like. The particular application of the mechanism to be described is left to the discretion of the user, versed in the art.

Referring now to Figure 1, a source of pressure 10 is generally indicated with which the pressure selective means S is directly connected. This pressure source 10 may be the well known storage tank in which volatile liquids are held, or a pipe line or other means requiring protection under varying conditions, or simply a pressure source variable to actuate the disclosed mechanism. A housing 12 adapted to maintain a body of sealing liquid 14 forms the stationary part of the pressure selective means S and is connected to the pressure source 10 by the two conduits 16 and 18. Both of these conduits extend through the sealing liquid to transmit pressures above the sealing liquid level into the inverted cups 20 and 22 respectively. A balance beam articulated at the pivotal point 24, and thus divided into two sections 26 and 28, positions the cups 20 and 22 in operating contact with the sealing liquid 14 over the conduits 16 and 18. A stop pin 30 on the beam section 26 and a like pin 32 extending from the inside of the housing 12 to engage the beam section 26 cooperate in controlling the reciprocation of the sealing cups as later described.

To illustrate one use for the device, the actuator is shown operating a pressure controlled relief valve generally noted as 34 in the drawing. A circulation chamber 36 of the valve 34 is connected to the pressure source 10 by a vent pipe 38. The outlet to the atmosphere is shown as a conduit 40 arranged to receive and seat two separate valve members 42 and 44. As noted above and fully understood after reading the later operating description, a wide selection of substituted mechanisms may be used in the place of this valve assembly. One use of the mechanism is merely indicated here.

Continuing the description of the pressure responsive actuator elements, attention is directed to the pressure responsive means R which includes the diaphragm 46. In this instance the diaphragm is used to obtain the reciprocating movement of the elements 42 and 44. A rod 48 extends from one surface of the diaphragm 46 to operatively engage the element 44. Enclosing the rod, the sleeve 50 is attached to the opposite diaphragm face. The sealing flange 52 rigidly attached to the sleeve 50 is inverted to engage a trough 54 containing a quantity of glycol or other sealing liquid 56. This arrangement permits the sleeve 50 to reciprocate freely as urged by the diaphragm and does not open the chamber 36 to admission of air. The rod 48 does not have a similar seal but is permitted to pass freely through the sleeve 50 and the element 42. The size of the aperture in element 42 for the passage of the rod is exaggerated in the drawing and is actually reduced in practice. A small amount of free play here is not injurious to the operation as will be explained in the discussion of the operation.

The pressure which operates the pressure responsive means R in the form of the diaphragm 46 is transmitted thereto from the pressure source by the pressure selective means S through conduit connection 58. Another inverted flange 60 extending downwardly into sealing engagement with liquid 62 in trough 64 is shown as the means of introducing the operating pressure into the flexible diaphragm. It will be evident that a simple flexible tube will supply this need, if desired. The bracket 66 admits the conduit 58, supports it in position for engagement with inverted cup 22, and also secures the trough 64.

Before describing the operation of the device, it is necessary to more fully detail the inverted cups 20 and 22 in the pressure selective means S. As noted above, the conduit 58 is positioned to engage the cup 22 by the bracket 66 or similar arrangement. The lower end of conduit 58 is adapted to extend into sealing contact with the aperture or port 68 in the top of cup 22. Acceleration for the movement into pressure transmitting relation between the cup 22 and the conduit 58 is supplied by the shape of the cup surfaces, external and internal. An offset 70 forming a surface substantially parallel with the surface of the liquid when in the inactive or neutral position as shown in Figure 1 and the bevelled end 72 provide the accelerating surfaces.

The cup 20, illustrated as larger than cup 22 and positioned on the end of the balance beam opposed to cup 22, is completely sealed. There is no pressure transmitting opening as in cup 22 nor conduit to pass the pressure through as described above for that element. Cup 20 remains in sealing contact with liquid 14 over the end of conduit 16 projecting above the liquid surface. There is a similarity with cup 22 however in the accelerating feature. An offset 74 not fashioned parallel to any reference surface and the end shown as substantially perpendicular to the liquid level in Figure 1 form the acceleration means of this cup.

In describing the operation of the pressure responsive actuator, the affect of either positive or negative pressures requiring control on operating responsive devices in general is the object. The positive and negative operating pressures will be called operating pressure and vacuum. The resultant movement of elements 42 and 44 are to be considered as either the end desired as in the illustrated condition of pressure relief, or as the means for initiating another operation such as closing circuits of electrical, hydraulic or fluid pressure forces. In either case, the purpose is to detail the operating relation of the pressure selective means S and the pressure responsive means R which in combination comprise the pressure responsive actuator. The detailed operation of the relief valve shown will be incidentally described for a full and comprehensive understanding of the device.

An excessive or operating pressure in the source 10 is required to initiate the initial movement of the pressure selective means S as evidenced by the oscillating inverted cups 20 and 22. This operating pressure may be either greater or less than atmospheric pressure and is selected to act at a specific force. Any pressure not amounting in force to the predetermined operating pressure will not operate the actuator. A positive operating pressure greater than atmospheric pressures and here termed simply as "pressure" will be first discussed.

Figure 2:
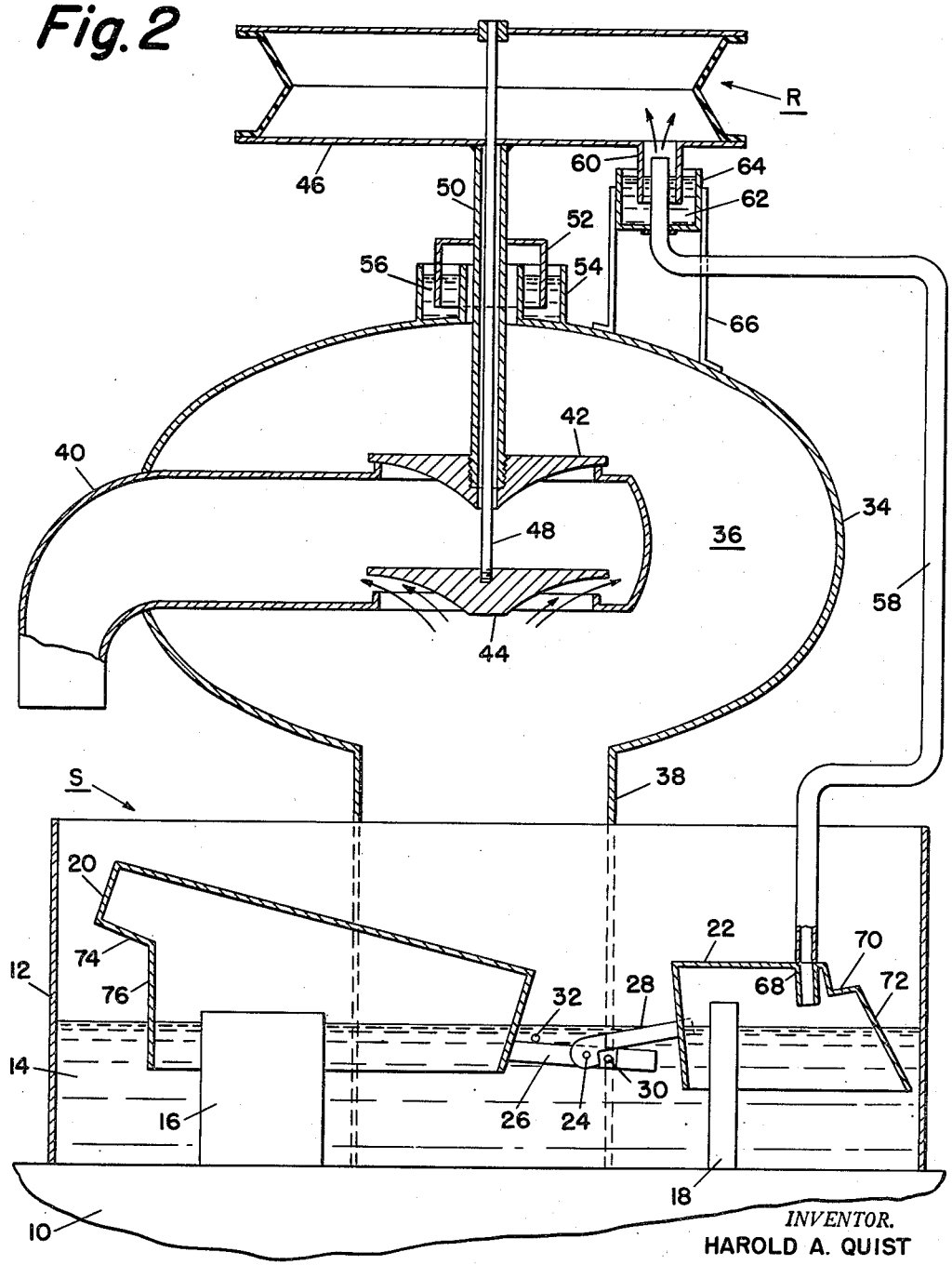
Figure 2 is an elevational view in section showing the device responding to an excess pressure condition.

Reference is made to Figures 1 and 2. In Figure 1 the normal or neutral position, also referred to as the non-operating position, is illustrated. This is the starting position for both the selective and responsive means (S and R) under any circumstance. The operating pressure from the source 10 is admitted to both inverted cups 20 and 22 above the level of the sealing liquid through the respective conduits 16 and 18. Both cups are lifted. Cup 20 on section 26 of the pivoted balance beam is stopped in upward movement by stop pin 32. The conduit 16 remains sealed as the cup 20 is still in contact with the liquid 14 and at sufficient depth to prevent the pressure gas from bubbling around the cup through the liquid.

Cup 22, however, is lifted by the pressure admitted through conduit 18 and pivots upwardly about the pivot suspension 24. This movement of cup 22 is free of any restraint of cup 20 on section 26 of the beam. The engaging aperture or port 68, sleeved as shown, remains sealed and thus retains the affect of the pressure in cup 22 until the end of conduit 58 is firmly engaged as shown in Figure 2. Then the selected pressure transmitted to cup 22 is passed to the pressure responsive diaphragm 46 directly from the pressure source without loss or diminished force.

The effect of the accelerating means involving offset 70 and bevelled end 72 is to increase the initially slow starting lift of cup 22 into a rapid and forceful engagement with conduit 58. At the beginning of the pressure effect, the cup 22 movement is opposed by atmospheric pressure outside the cup and the weight of the cup body both acting downwardly about the pivot 24. The sole upward force is the unit pressure exerted on the exposed internal cup area above the liquid level as shown in Figure 1. In order to initially move the cup 22 the total internal force must exceed the outward opposing force.

As the cup 22 lifts in rotating movement in response to the total internal force, the area of the offset 70 and the increasing area of the bevelled edge 72 increases the lifting force rapidly and out of proportion to the restraining forces. The sharply accentuated lift which carries the cup into contact with the conduit 58 is the result, primarily, of the offset 70 clearing contact with the liquid 14. The immediate affect is to increase the area subjected to the force of the pressure by the dimensional area of the offset. The area of the sloping end 72 also increases the effective area within limits. The primary purpose of the sloping end is not so much to increase the upward force directly however, as it is to decrease the downward or counteracting movement of the weight of the cup about the pivot 24. As there is a buoyancy component urging the cup upward on the surface of the sloping end 72 as well as the downward component caused by weight, the slope is selected to cancel these opposed moments as nearly as possible. In this way the sharp lift of the effective area of offset 70 is accentuated and unretarded.

The full force of the pressure from the pressure source is transmitted sharply to conduit 58 when the cup 22 of the pressure selective means is urged into contact. This condition remains in effect as long as the force from the source is great enough to hold the cup against the conduit. This condition is illustrated in Figure 2 where cup 22 is passing the pressure through the cup above the sealing liquid and outwardly through the aperture 68 to conduit 58. In the responsive means R, diaphragm 46, the effect is to expand the sides which directly moves the rod 48, sleeve 50 and the movable elements 42 and 44. In this instance where pressure is considered these elements move toward each other closing the gap between them.

After the pressure condition is exhausted or otherwise becomes ineffectual, both cups 22 and 20 drop down to their normal position. As cup 22 is disengaged from conduit 58 atmospheric pressure is selected to take the place of the escaping source pressure and the external and internal diaphragm pressures are balanced at atmospheric force. The resulting movement by the responsive means R of the elements 42 and 44 with their respective connecting members is to the normal position. In this illustration the movement is from the closed pressure excited position to a more extended spacing.

Figure 3:
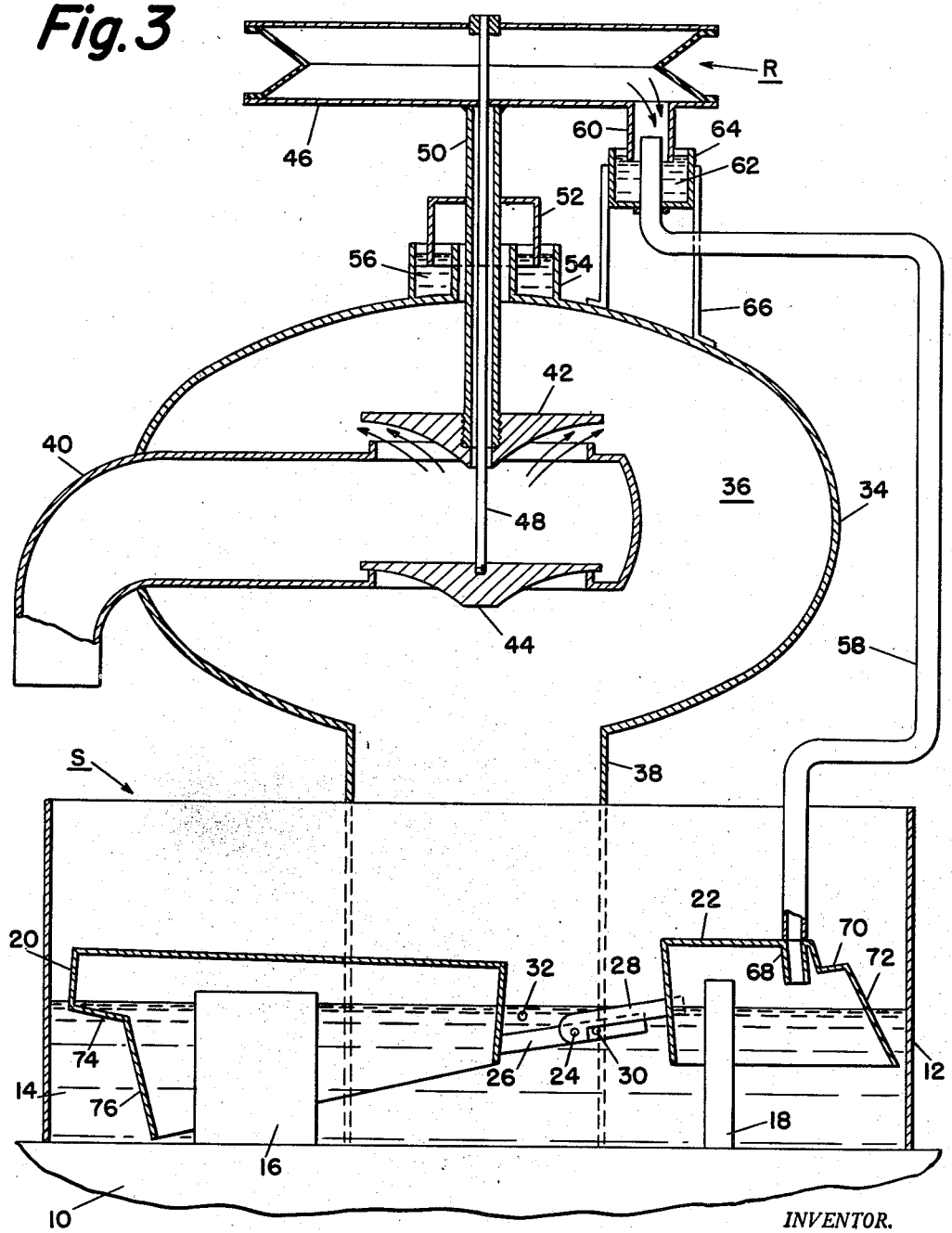
Figure 3 is an elevational view in section showing the device responding to an excess vacuum condition.

For a consideration of the relative movements of the elements in response to a selected negative pressure or vacuum, reference is made to Figures 1 and 3. Initially the elements are in their normal relation shown in Figure 1. The creation of a negative pressure force in the pressure source is transmitted through conduits 16 and 18 to the respective inverted cups 20 and 22 of the selective means S. The tendency of the negative pressure is to cause the cups to sink further into the liquid and additionally secure the sealing of the conduits 16 and 18. The difference in the effective areas between the cups now becomes effective and the greater atmospheric force component operating on the larger cup pushes cup 20 down deeper into the sealing liquid than cup 22. Pin 30 on section 26 of the balance beam catches the section 28 and lifts cup 22 upwardly around the pivot support 24 toward engagement with conduit 58.

At this time the internal negative force in cup 20 is partially offset by the like pressure acting on offset 74 area. The cup 20 moves downwardly and gradually submerges the 74 offset area in the sealing liquid. At the point of submergence when the opposed effect of this area is no longer counteracting an equal part of the force acting in the opposite direction, the action is accelerated. Cup 20 moves sharply downwardly lifting cup 22 into transmitting engagement with conduit 58. As has been indicated in describing cup 22 above, the sloping end of cup 20 is also determined by the buoyant force necessary to counterbalance the weight moment thus giving more effect to the acceleration caused when the offset area 74 is submerged.

The negative or vacuum pressure is transmitted to the pressure responsive diaphragm causing the sides flexibly connected to draw together as shown in Figure 3. With this inward movement of the sides of the diaphragm, the rod 48 and the sleeve 50 urge the elements further apart than the normal spacing, contrary to the movement resulting from the pressure response described above.

It is evident that the relief of the vacuum condition or other interruption altering the operating pressure received from the source of the pressure, releases the cup 22 to return to the non-operating position of Figure 1. As in the pressure release described above, atmospheric pressure is admitted to the diaphragm and the pressure balance is immediately and completely re-established. The movable elements 42 and 44 readjust, drawing together to resume the normal spacing.

Both the excessive pressure or excessive vacuum conditions are transmitted at full force to operate within the responsive means R, diaphragm 46. In the device as shown, it is possible for either of these conditions to be slightly affected by the escape of air at atmospheric pressure along the rod 48 and sleeve 50 to the body of the diaphragm. Glands to withstand this interchange of pressures may be fitted between the rod and sleeve if desired. For normal operation, however, they are not necessary.

Considering the illustrated use of the described device and substituting the term "valve member" for each of the elements 42 and 44, a pressure relief valve mechanism is evident. In response to the pressure operation where the diaphragm sides are expanded, valve member 42 attached to sleeve 50 is more firmly seated. Contrary, the valve member 44 is lifted by rod 48 permitting the pressure from the source 10 to escape through vent pipe 38 and out through relief conduit 40. After the pressure is relieved the valve member 44 returns to its seat in conduit 40.

In response to the vacuum condition, the sides of the diaphragm are collapsed forcing valve element 44 into firm relation with its seat. Valve element 42 is lifted from the seat by the movement of connecting sleeve 50. This movement breaks the vacuum in the pressure source by admitting air at atmospheric pressure through conduit 40 to vent pipe 38 and thence to the pressure source. After relief of the vacuum condition, the re-establishment of balanced pressure in the diaphragm reseats both valve members in the normal or non-operating position.

The purpose of the disclosed device is to respond to selected pressures above and below a determined neutral or nonoperating condition. Although atmospheric pressure has been selected as the base of operation in this disclosure, it will be evident that the mechanism is readily adaptable for use with any pressures. Confining the pressure selective mechanism S, pressure responsive means R and feed conduit 58 within a pressure restraining housing and substituting another basic pressure for atmosphere will permit the use of this device under a wide variation of relative pressure conditions. A basic pressure high or low in value relative to our atmospheric pressure may be impressed on the apparatus thus confined and operation attained by using excess pressure and vacuum relative to the adapted pressure in the way already described. It is possible to substitute both a variety of pressure conditions and equivalent elements within the concept of this invention without changing its spirit. All such substitutions and changes are contemplated by the inventor except as limited expressly in the accompanying claims.

The invention claimed is:

1. A system for selectively operating devices by pressure from a variable pressure source comprising oscillating pressure selective means including a housing adapted to contain a liquid seal, a first inverted cup pivoted at a suspension point in said housing to engage the liquid seal, a second inverted cup separately pivoted at the point of suspension in sealing engagement with the liquid and being adapted to transmit pressures therethrough in selected positions relative to the liquid seal, restricting means requiring the cups to oscillate together only for the downward movement of the first cup resulting in the upward movement of the second cup, pressure transmitting conduits extending through the housing to open beneath said cups above the level of the liquid seal, a diaphragm having opposed walls flexibly connected together, independently movable arms separately connected to said opposed walls, and a conduit positioned to engage the second cup thereby connecting the diaphragm to the pressure selective means.

2. A system for selectively operating devices by pressure from a variable pressure source comprising a housing adapted to hold a liquid, a pair of inverted cups in sealing engagement with the liquid and pivotally linked together at a point of suspension in said housing for separate oscillatory response to pressure variations, one of said cups having an opening normally sealed by the liquid arranged for the transmission of pressure on becoming unsealed, restrictive means cooperatively engaging said cups to require uniform oscillatory movement in response to a determined pressure variation, pressure transfer conduits extending through the housing into the inverted cups above the level of the liquid seal, a hollow diaphragm with stiff opposed walls positioned externally of said housing, reciprocable rods separately connected to said opposed diaphragm walls, and conduit means connected to the diaphragm and positioned to be engaged by the opening so arranged in one of said inverted cups for the transmission of determined pressures from the pressure source to the diaphragm.

3. A system for selectively operating devices by pressure from a variable pressure source comprising a housing adapted to contain a liquid, two pressure transmitting conduits extending through the housing to open above the liquid in spaced relation, inverted cups enclosing the conduits in sealing contact with the liquid in said housing, one of said cups having a port to transmit pressure therethrough when unsealed by the liquid, supporting arms for each of said cups pivotally joined at the point of suspension to permit said cups to oscillate separately, a stop pin in one of said supporting arms limiting the independent oscillation of said cups to one direction, a diaphragm having opposed walls connected by a flexible member, concentrically arranged members extending from fixed engagement with the separate walls of said diaphragm and slidably responsive to the movements thereof, and pressure transmitting means positioned to connect the pressure transmitting port of the cup with the diaphragm during periods of excessive pressures.

4. A system for selectively operating devices by pressure from a variable pressure source comprising a housing adapted to contain a sealing liquid, a pair of inverted cups suspended to independently oscillate about a common pivotal point in said housing and in engaging contact with the level of the liquid seal, locking means arranged to restrain the movements of said cups in response to one predetermined pressure condition, pressure transmitting conduits extending through the housing conducting the variable pressure of the source into the inverted cups above the sealing liquid level, a diaphragm with substantially rigid walls flexibly connected together in sealed relation positioned externally of said housing, linkage means cooperatively engaging the diaphragm walls for connection with operable devices, a tube extending from sealed connection with said diaphragm to fixed position adjacent one of said cups, and means in said cup normally closed by the liquid seal for releasably engaging said tube when oscillated to an unsealed position in response to selected pressure conditions for transmission of pressure from the variable source to the diaphragm.

5. In a system for limiting variations of pressure in a liquid storage element, the combination of a housing adapted to contain a sealing liquid, inverted cups exposed to atmospheric pressure whose lower open ends extend into the body of liquid, conduits affording communication between the storage element and the interiors of the cups above the liquid level, a chamber in communication with the storage element and having an outlet to the atmosphere, valve means normally closing said outlet, a hollow diaphragm connected and arranged when expanded or contracted under predetermined increased or decreased pressure to operate said valve means to open said outlet, a conduit at one end communicating with said diaphragm and normally open at the other end to the atmosphere, one of said cups having an opening normally in sealing engagement with the liquid and adapted, upon lifting of the cup under predetermined superatmospheric pressure, to connect through said opening the last named end of said conduit with the interior of such cup whereby the hollow diaphragm is subjected to the pressure within the liquid storage element and by operating said valve means as above specified connects said chamber with the atmosphere.

6. In the system defined in claim 5 in which the other cup has an area exposed to atmospheric pressure exceeding that of the area, so exposed, of the cup operable as specified in claim 5 and which, under predetermined subatmospheric pressure, is moved downward by atmospheric pressure further into the body of liquid, and a connection between the two cups effective, in such depression of the cup having the greater area exposed to atmospheric pressure, to lift the cup having the smaller area exposed to atmospheric pressure and connect its interior with the hollow diaphragm as hereinbefore specified to thereby subject the diaphragm to the reduced pressure within the liquid storage element and by operating said valve means as specified connects said chamber with the atmosphere.

7. A system for selectively operating devices by pressure from variable sources comprising pressure selective means including a housing adapted to contain a liquid, a pressure transmitting cup and an operating cup in normal sealing position with the liquid mounted in spaced relation on a pivotally supported balance beam, said beam divided into two sections attached to the respective cups and pin-connected at the pivot point to permit relative movement of each of said cups about the pivot, pressure transmitting conduits extending through the housing to open beneath said cups above the level of the liquid, the pressure transmitting cup apertured to transmit pressure therethrough when the aperture is lifted from sealing engagement with the liquid, means limiting the upward movement of the operating cup to a position of sealing contact with the liquid over the pressure transmitting conduit extending therein, engaging means on said balance beam positioned to transmit downward movement of the operating cup to move the pressure transmitting cup in upward direction only; responsive means arranged for actuation by pressure transmitted through the selective means, and a conduit connected to transmit pressure to operate the responsive means and positioned to engage the aperture in the pressure transmitting cup as said cup lifts in response to pressures.

8. The system defined in claim 7 further characterized by said responsive means including a diaphragm body having opposed walls flexibly connected together and independently movable arms separately connected to the opposed walls to move in response to the pressure actuated movement thereof.

9. A device for selectively transmitting operating pressures from variable pressure sources comprising a housing adapted to contain a liquid, a pressure transmitting cup and an operating cup mounted in spaced relation on a pivotally supported balance beam in normal sealing position with the liquid, said beam divided into two sections attached to the respective cups and pin-connected at the pivot point to permit relative movement of each of said cups about the pivot, pressure transmitting conduits extending through the housing to open beneath said cups above the level of the liquid, the pressure transmitting cup apertured to transmit pressure therethrough when in the lifting of the cup the aperture is lifted from sealing engagement with the liquid, means limiting the upward movement of the operating cup to a position of sealing contact with the liquid over the pressure transmitting conduit extending therein, and engaging means on said balance beam positioned to transmit downward movement of the operating cup to the pressure transmitting cup in upward direction only.

10. In a system for limiting variations of pressure in a liquid storage element, the combination of a housing adapted to contain a sealing liquid, inverted cups exposed to atmospheric pressure whose lower open ends extend into the body of liquid, conduits affording communication between the storage element and the interiors of the cups above the liquid level, a chamber in communication with the storage element and having an outlet to the atmosphere, a pressure-transmitting conduit open at one end to the atmosphere, one of said cups having an opening normally in sealing engagement with the liquid and adapted, upon the lift of the cup under predetermined superatmospheric pressure, to connect through said opening the end of said conduit normally open to the atmosphere with the interior of said cup, the other cup having an area exposed to atmosphere substantially exceeding the area, so exposed, of the first named cup and which, under predetermined sub-atmospheric pressure, is moved down by atmospheric pressure further into the body of the liquid, a connection between the two cups effective, in such depression of the second named cup, to lift the first named cup against atmospheric pressure and connect the end of said conduit normally open to the atmosphere with the interior of the first named cup, valve means normally holding closed said outlet from said chamber to the atmosphere, and means, operable by rise or fall of pressure in said pressure-transmitting conduit when connected with the interior of the first cup as above specified, to actuate said valve means to open the outlet from said chamber to the atmosphere.

11. The combination defined in claim 10 in which the valve means comprises two separate valves closing when seated communication between said chamber and the atmosphere, either valve opening said communication when unseated.

12. The combination defined in claim 11 in which the means operating the valve means comprises a contractible and expansible diaphragm with which the other end of the pressure-transmitter conduit is connected, and separate connections between the diaphragm and the respective valves operable respectively by the expansion and contraction of the diaphragm.

References Cited in the file of this patent

UNITED STATES PATENTS

| | | |
|---|---|---|
| 1,671,275 | Clithero | May 29, 1928 |
| 1,678,700 | McEwan | July 31, 1928 |
| 1,685,516 | Atwell | Sept. 25, 1928 |
| 1,900,165 | De Monge | Mar. 7, 1933 |
| 2,201,752 | Winberg | May 21, 1940 |
| 2,225,964 | Bailey | Dec. 24, 1940 |

FOREIGN PATENTS

| | | |
|---|---|---|
| 19,800 | Great Britain | 1912 |